(12) United States Patent
Numano

(10) Patent No.: US 8,913,727 B2
(45) Date of Patent: Dec. 16, 2014

(54) PRESENCE TRANSMISSION METHOD, VIDEO DISPLAY DEVICE, AND VIDEO DISPLAY SYSTEM

(75) Inventor: Fujihito Numano, Toshima-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 566 days.

(21) Appl. No.: 13/275,986

(22) Filed: Oct. 18, 2011

(65) Prior Publication Data

US 2012/0162345 A1     Jun. 28, 2012

(30) Foreign Application Priority Data

Dec. 27, 2010   (JP) .................................. 2010-290288

(51) Int. Cl.
*H04M 3/42* (2006.01)
*H04N 7/14* (2006.01)

(52) U.S. Cl.
CPC ...... *H04M 3/42374* (2013.01); *H04M 2201/38* (2013.01); *H04M 2201/14* (2013.01); *H04N 7/147* (2013.01)
USPC ................ 379/201.01; 348/14.04; 379/88.17; 379/93.01; 379/215.01

(58) Field of Classification Search
CPC ........................... H04M 3/38–3/42127; H04M 3/42229–3/42272; H04M 3/42348–3/42391; H04M 7/0012; H04M 7/0033; H04M 7/006–7/009; H04M 1/2535; H04M 1/64–1/658; H04M 3/42187
USPC ................... 348/14.01–14.16; 370/259–271; 370/351–357; 379/67.1–88.28, 379/93.01–93.04, 142.01–142.18, 379/201.01–207.01, 209.01–214.01, 379/265.01–266.1, 207.02, 208.01–215.01; 455/412.1–426.2, 456.1–466, 455/550.1–560, 575.1–575.9, 90.1–90.3; 704/270–278; 709/201–207, 217–248
See application file for complete search history.

(56) References Cited

U.S. PATENT DOCUMENTS

| | | | |
|---|---|---|---|
| 6,246,889 B1* | 6/2001 | Boltz et al. ..................... 455/567 |
| 7,817,790 B2* | 10/2010 | Sanmugasuntharam et al. ......................... 379/142.06 |
| 8,180,026 B2* | 5/2012 | MacIsaac ................... 379/88.21 |
| 2001/0024951 A1* | 9/2001 | Rignell et al. ................ 455/414 |
| 2003/0100261 A1* | 5/2003 | Gusler et al. .................... 455/18 |
| 2004/0203632 A1* | 10/2004 | Schaaf ....................... 455/414.1 |
| 2006/0045240 A1* | 3/2006 | Buchner ...................... 379/67.1 |
| 2007/0213100 A1* | 9/2007 | Osann, Jr. .................... 455/567 |
| 2008/0063181 A1* | 3/2008 | Khouri et al. ............ 379/373.02 |

FOREIGN PATENT DOCUMENTS

| JP | 2006180465 | 7/2006 |
|---|---|---|
| JP | 2010-118801 | 5/2010 |

OTHER PUBLICATIONS

Japanese Patent Application No. 2010-290288, Notice of Rejection, mailed May 29, 2012, (with English Translation).

* cited by examiner

*Primary Examiner* — Hemant Patel
(74) *Attorney, Agent, or Firm* — Blakely, Sokoloff, Taylor & Zafman LLP

(57) ABSTRACT

According to one embodiment, a presence transmission method includes: controlling communication of a call via a network; transmitting, via the network, presence indicating a current status; and executing predetermined functions. If a specific function that causes delay in answering an incoming call is to be executed among the predetermined functions, presence indicating that it takes time to answer an incoming call is transmitted via the network.

7 Claims, 6 Drawing Sheets

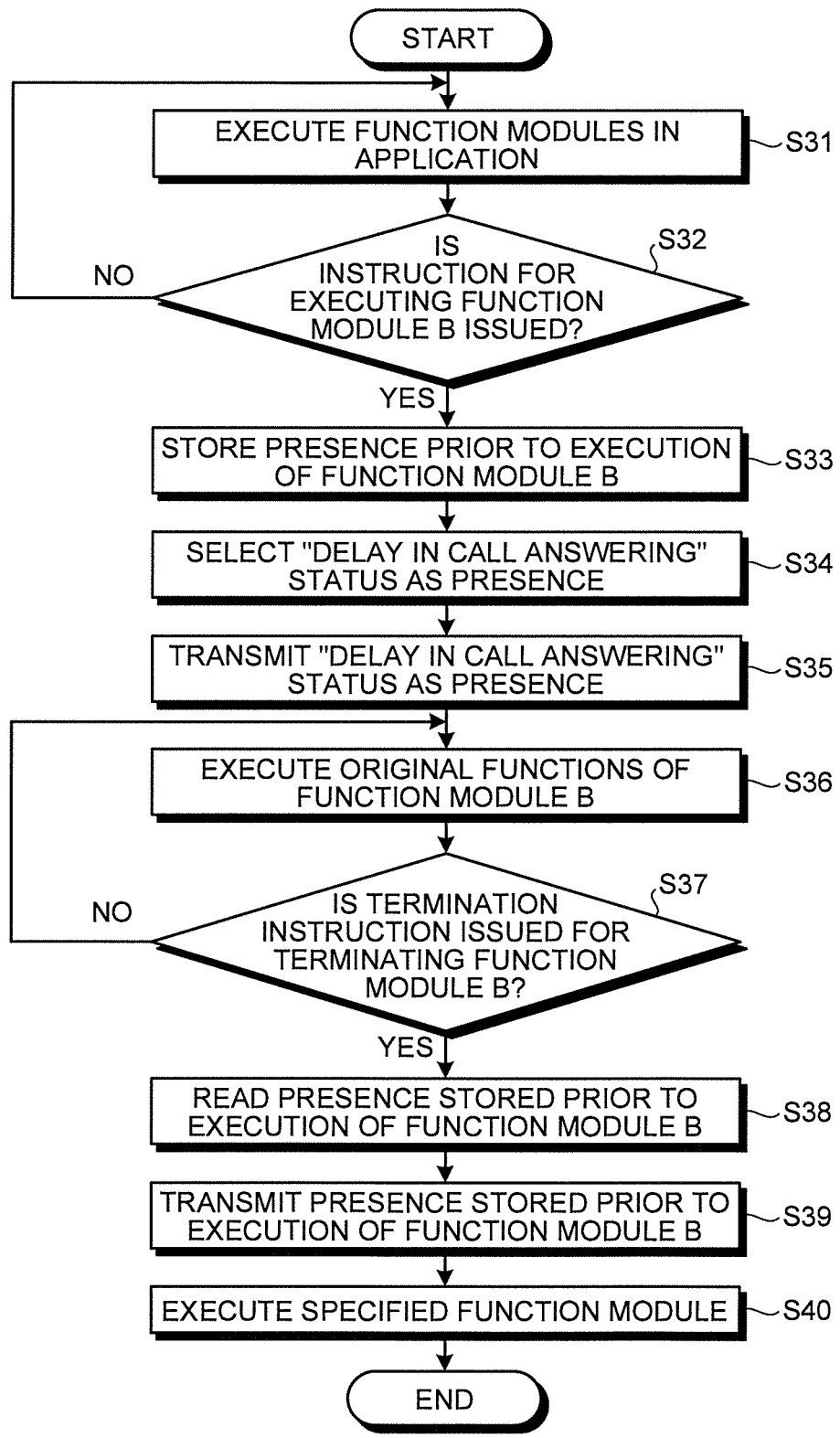

PRESENCE TRANSMISSION METHOD, VIDEO DISPLAY DEVICE, AND VIDEO DISPLAY SYSTEM

CROSS-REFERENCE TO RELATED APPLICATIONS

This application is based upon and claims the benefit of priority from Japanese Patent Application No. 2010-290288, filed Dec. 27, 2010, the entire contents of which are incorporated herein by reference.

FIELD

Embodiments described herein relate generally to a presence transmission method, a video display device, and a video display system.

BACKGROUND

In recent years, there is an increasing use of terminals such as broadcast receivers having a communication function. The communication function enables broadcast receivers to communicate with each other or with other mobile terminals and information processors.

In such a conventional technology, there is a case that, upon receiving an incoming call, a terminal cannot immediately switch to the communication function and cannot answer the call. As a result, the caller may mistakenly hang up assuming that the other party is not available. This interferes with smooth communication between the two.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 9 is an exemplary flowchart of a presence transmission process in the second embodiment.

DETAILED DESCRIPTION

In general, according to one embodiment, there is provided a presence transmission method comprising: controlling communication of a call via a network; transmitting, via the network, presence indicating a current status; and executing predetermined functions. If a specific function that causes delay in answering an incoming call is to be executed among the predetermined functions, presence indicating that it takes time to answer an incoming call is transmitted via the network.

Figure 1:
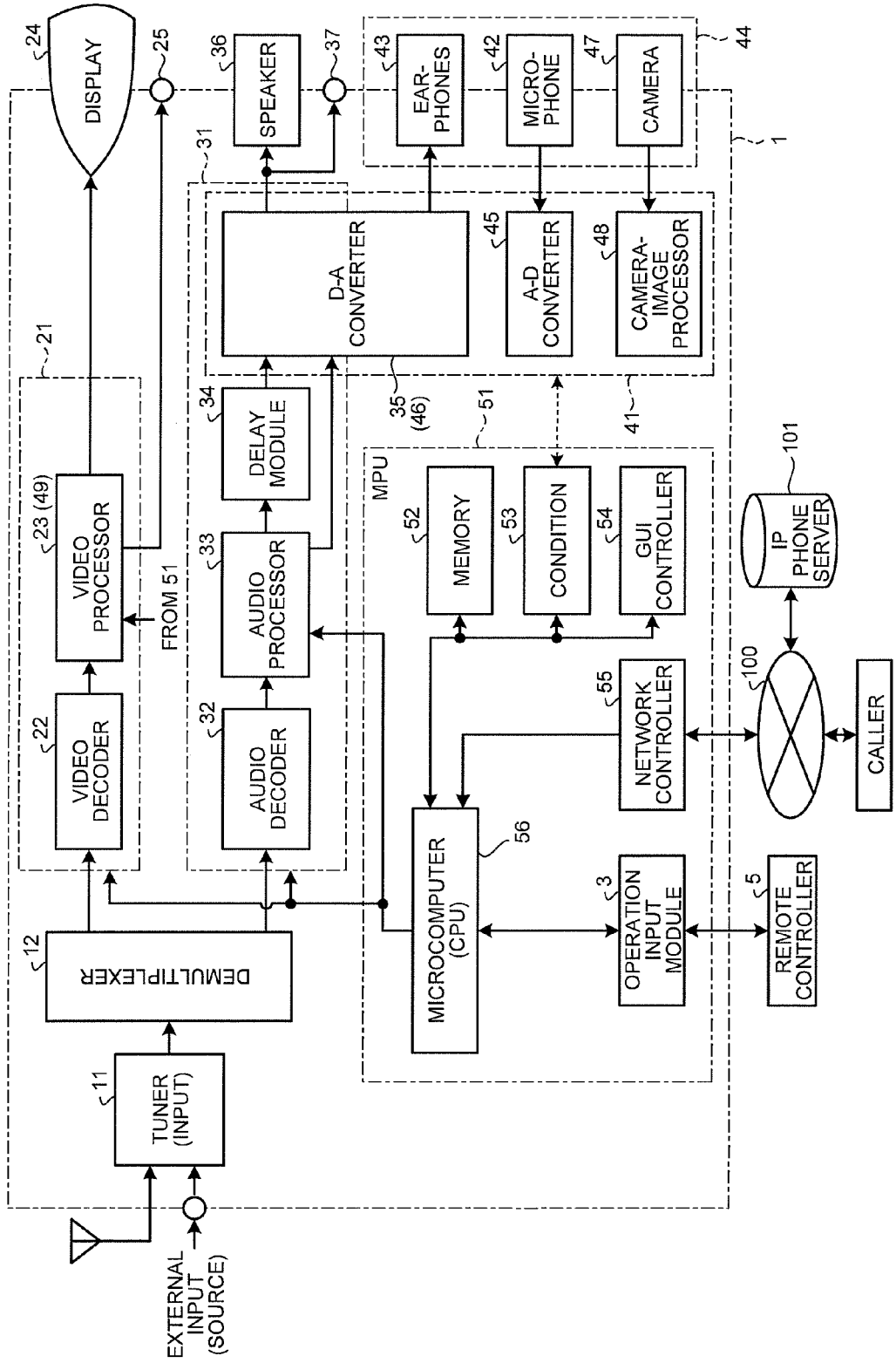
FIG. 1 is an exemplary schematic diagram of a video display device and a communication device installed in the video display device according to a first embodiment.

Exemplary embodiments will be described in detail below with reference to the accompanying drawings. FIG. 1 is a schematic diagram of a video display device and a communication device installed in the video display device according to a first embodiment. The constituent elements or the configurations described below may be implemented by hardware or by software using a microcomputer (a processor or a central processing unit (CPU)) or the like.

As illustrated in FIG. 1, a video display device may be, for example, a television (TV) receiver capable of receiving TV broadcasting and reproducing audio and video contents.

A TV receiver (video display device) 1 is capable of receiving and reproducing at least a digital broadcast program (content). The TV receiver 1 is also capable of receiving content supplied via a network 100 such as the Internet. Further, with an arbitrary device connected via the network 100, the TV receiver 1 is capable of communicating using an Internet protocol (IP) phone, which allows communication of voice or sound (including audio) and moving images (video) based on the Internet protocol.

In the TV receiver 1, content (program) is received by a tuner 11 and then demultiplexed by a demultiplexer (demux) 12 into video data and audio data.

The video data obtained by the demultiplexer 12 is decoded by a video decoder 22 constituting a video processing block 21 and output as a digital video signal.

The video data decoded by the video decoder 22 is then fed to a video processor 23 for processing the video data into a format displayable on a display 24. More specifically, the video processor 23 converts the video data into data of a predetermined resolution and a predetermined output mode such as the interlace (i)/non-interlace (p) mode, and feeds it to the display 24. The output of the video processor 23 may be fed to an output terminal 25 to which, for example, an external monitor or a projector is connectable.

Meanwhile, the audio data obtained by the demultiplexer 12 is decoded by an audio decoder 32 constituting an audio processing block 31 and output as a digital audio signal.

The audio signal decoded by the audio decoder 32 is input via an audio processor 33 and then a delay module 34 to a digital-to-analog (D-A) converter 35 for obtaining analog audio output. The audio processor 33 processes the audio signal into a format reproducible by an audio output module. The delay module 34 delays the output of the audio processor 33 (i.e., delays the audio output) by a predetermined time period to achieve time consistency with the video signal output by the video processor 23.

The analog audio output from the D-A converter 35 is fed to, for example, a speaker 36 (such as a loudspeaker). The output of the D-A converter 35 may also be fed to an output terminal 37 to which an audio visual (AV) amplifier and the like is connectable.

The audio signal delayed by a predetermined time period by the delay module 34 is also fed to an IP phone controller 41 functioning as a communication controller. To the IP phone controller 41 can be connected, for example, a communication set 44 comprising a sound input module (microphone) 42 and an audio player (earphones or a speaker for playing low-output sound) 43. Besides, the IP phone controller 41 comprises an analog-to-digital (A-D) converter 45 that performs analog-to-digital conversion on input from the sound input module (microphone) 42 and a D-A converter 46 that performs digital-to-analog conversion on output to an audio player. The D-A converter 46, which performs digital-to-analog conversion of output to an audio player, is shared with the D-A converter 35 constituting the audio processing block 31.

The IP phone controller 41 may be accompanied by a camera 47, which captures an image of user's face, and a camera-image processor 48. In addition, the IP phone controller 41 may be accompanied by an image processor 49 that reproduces video received from the other end of communication.

The image processor 49 is capable of reproducing, for example, still images as typified by JPEG images (JPEG stands for Joint Photographic Experts Group) or moving images as typified by MPEG-2 images or MPEG-4 (H.264-AVC) images (MPEG stands for Moving Picture Experts Group). The image processor 49 that reproduces moving images is shared manner with the video processor 23 constituting the video processing block 21.

In the TV receiver (video display device) 1, the tuner 11, the demultiplexer 12, the video processing block 21, the audio processing block 31, and the IP phone controller 41 perform predetermined process under the control of a main control block 51.

The main control block, i.e., main processing unit (MPU) 51 comprises, for example, a CPU or a microcomputer. More specifically, the MPU 51 comprises at least a memory 52, a condition controller 53, a graphical user interface (GUI) controller 54, and a network controller 55. The memory 52 comprises at least a read only memory (ROM) for storing operation programs and a random access program (RAM) serving as a work memory. The condition controller 53 controls an incoming call received from the outside to the IP phone controller 41 or an outgoing call to the outside from the IP phone controller 41. The GUI controller 54 processes GUI displayed on the display 24 and user input from the GUI. The network controller 55 controls the connection with the network 100, i.e., obtains a variety of information from the network 100 and controls the user access to the network 100.

To the MPU 51 is connected an operation input module 3 that receives control input from the user.

The operation input module 3 comprises at least, for example, channel keys (buttons) for specifying a channel selected by the tuner 11 (input module) and a receiver for receiving instructions or control input from a power ON/OFF switch used to turn power on/off or a remote controller 5. It is also possible to connect a keypad (keyboard) that allows the input of letters, codes, and numeric characters.

The IP phone controller 41 follows firmware of the MPU 51 or an IP phone program running according to a program written in advance such as "Skype" that is the Internet phone provided by the Skype Technologies S.A. The IP phone controller 41 packetizes the voice of the user caught by the microphone 42 of the communication set 44 and transmits the packets to the other end of communication via the network (the Internet). It is obvious that, if the camera 47 is installed, an image of the user is also packetized and transmitted with the voice.

Figure 2:
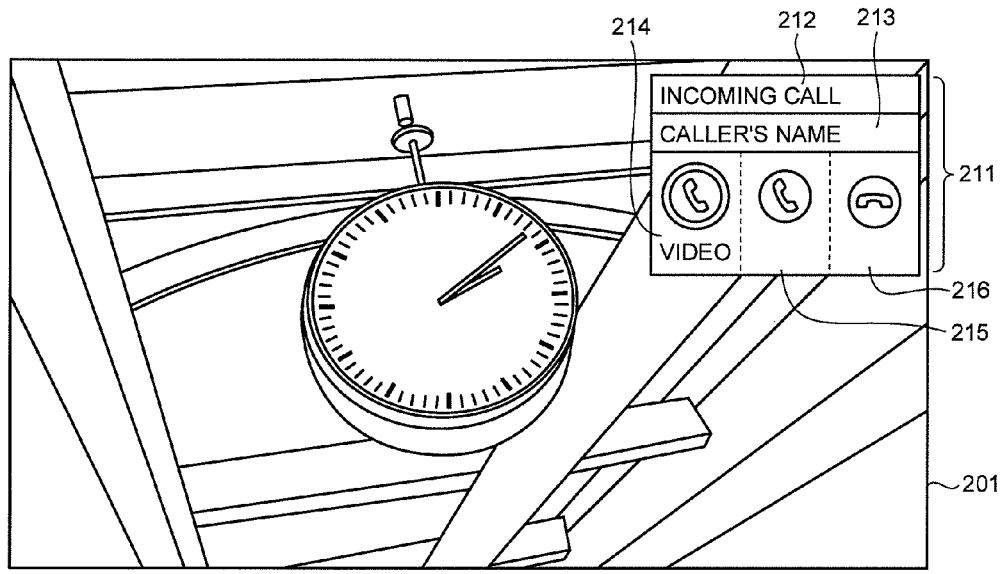
FIG. 2 is an exemplary diagram of a communication function screen displayed on the video display device in the first embodiment.

Assume that, while the TV receiver 1 is being used to view a program (content), an incoming IP phone call is received via the network 100. In this case, as illustrated in FIG. 2, in a "video display" 201 of the program being viewed, an "incoming call display" 211 is displayed at an arbitrary position (at the upper right corner in FIG. 2) under the control of the GUI controller 54.

The "incoming call display" 211 includes, for example, a "call display" 212 indicating that an incoming call is received, a "caller display" 213 indicating a caller or the other party, and an "answer display <1>" 214, an "answer display <2>" 215, and an "answer display <3>" 216 indicating how to answer the incoming call. The "answer display <1>" 214 indicates an answer with video, the "answer display <2>" 214 indicates an answer by only voice, and the "answer display <3>" 215 indicates no answer. Thus, the user can select whether or not to answer the call and how to answer it moving a cursor movement or focus with the remote controller 5.

The MPU 51A comprises a CPU 56 that executes various applications. The application programs are stored in a ROM (not illustrated), and the CPU 56 reads those application programs from the ROM and executed them.

During the display of broadcast reception or some other application running on the TV receiver 1, a screen for the communication function such as Skype is not displayed. Besides, the communication function allows the user to select how to respond to an incoming call. For example, if an incoming call is received while some application is running, the user has the option of starting communication immediately or, when the running application needs to be closed first, only allowing a notification of the incoming call on the screen, closing the screen of the application being displayed, and then answering the incoming call.

However, in the case of the latter option, following issues need to taken into consideration. Some applications do not need many operations on the remote controller to switch to the communication function, while some applications need a lot of operations on the remote controller to switch to the communication function. While an application of the former type is running, it is relatively easy to deal with an incoming call. On the other hand, if an incoming call is received while an application of the latter type is running, it is difficult to immediately run the communication function such as Skype by operating the remote controller a number of times. Hence, it takes time to answer the incoming call.

Applications such as a normal TV application, a network TV application, a programmed recording application, and a program guide display application cause delay in answering an incoming call.

Due to such a delay in answering an incoming call, the caller who has called the user of the TV receiver 1 may mistakenly hang up assuming that the user of the TV receiver 1 is not available. In view of this, in the first embodiment, if a running application is of the type that causes delay in switching to the communication function to answer an incoming call, a notification that it takes time to answer the incoming call is sent over the network 100 as a presence indicating the current status of the user of the TV receiver 1.

Meanwhile, of the applications executed by the CPU 56, specific applications such as the normal TV application, the network TV application, the programmed recording application, and the program guide display application that cause delay in answering an incoming call are hereinafter collectively referred to as "application".

The applications that cause delay in answering an incoming call are not limited to the abovementioned applications. Moreover, the reason for the occurrence of delay in answering an incoming call is not limited to the extensive use of the remote controller.

Figure 3:
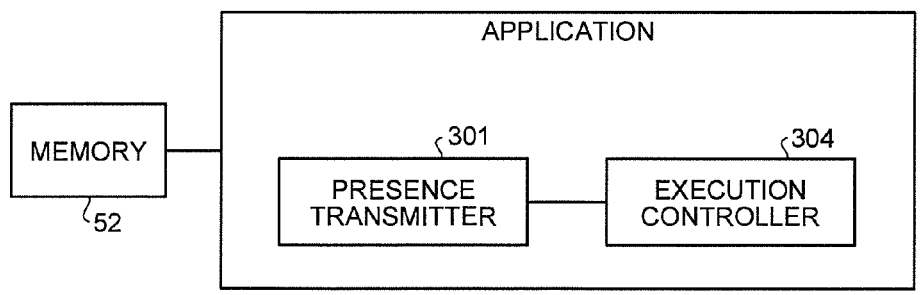
FIG. 3 is an exemplary functional block diagram of a configuration of an application in the first embodiment.

FIG. 3 is a functional block diagram of a configuration of the application according to the first embodiment. As illustrated in FIG. 3, the application mainly comprises a presence transmitter 301 and an execution controller 304.

In the first embodiment, in the memory 52 are stored various presences indicating the current status of the user of the TV receiver 1. More specifically, the memory 52 stores "online" status, "offline" status, "away" status, and a "delay in call answering" status as presences. The "delay in call answering" status indicates that it takes time to answer an incoming call. Moreover, as described later, the memory 52 temporarily stores presence of the user prior to the activation of the application.

The execution controller 304 controls execution of the application. When the application is activated, the execution controller 304 stores, in the memory 52, presence prior to the activation of the application as pre-activation presence. Then, when the execution of the application is terminated, the execution controller 304 retrieves the pre-activation presence from the memory 52 and sets it as current presence.

Once the application is activated, the presence transmitter 301 selects the "delay in call answering" status as presence from among the presences stored in the memory 52, and transmits the presence over the network 100. As a result, in presence display of the communication function of all devices connected to the network 100, an icon corresponding to the "delay in call answering" status is displayed as the presence of the user of the TV receiver 1.

Described below are the details of a device at the other end of communication with the user of the TV receiver 1. In the following description, an information processor such as a personal computer (PC) is taken as an example of the device at the other end of communication. However, the device at the other end of communication is not limited to an information processor such as a PC, and may be any device such as a mobile terminal or a TV receiver equipped with the communication function.

Figure 4:
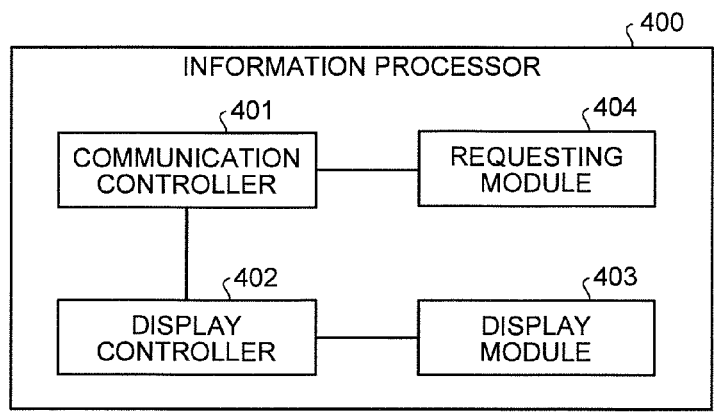
FIG. 4 is an exemplary functional block diagram of a configuration of an information processor in the first embodiment.

FIG. 4 is a functional block diagram of a configuration of an information processor 400 at the other end of communication. As illustrated in FIG. 4, the information processor 400 mainly comprises a communication controller 401, a requesting module 404, a display controller 402, and a display module 403. Meanwhile, the information processor 400 has the hardware configuration of a normal computer comprising a CPU, a storage device such as a memory or a hard disk drive (HDD), an input device such as a keyboard or a mouse, and the display module 403 such as a liquid crystal display (LCD).

The communication controller 401 controls outgoing calls sent to and incoming calls received from devices at the other end of communication. Moreover, the communication controller 401 receives the presence of the users of the devices connected to the network 100. Furthermore, the communication controller 401 controls communication with an IP phone server 101 connected to the network 100.

Via the communication controller 401, the requesting module 404 requests the IP phone server 101 for an icon corresponding to presence received by the communication controller 401. The icon sent from the IP phone server 101 is received by the communication controller 401.

The display module 403 is a display device such as LCD. The display controller 402 controls the display of various screens on the display module 403. In the first embodiment, on the display module 403, the display controller 402 displays not only the screen of the communication function such as Skype but also icons corresponding to the presences of "online" status, "offline" status, "away" status, and "delay in call answering" status.

Figure 5:
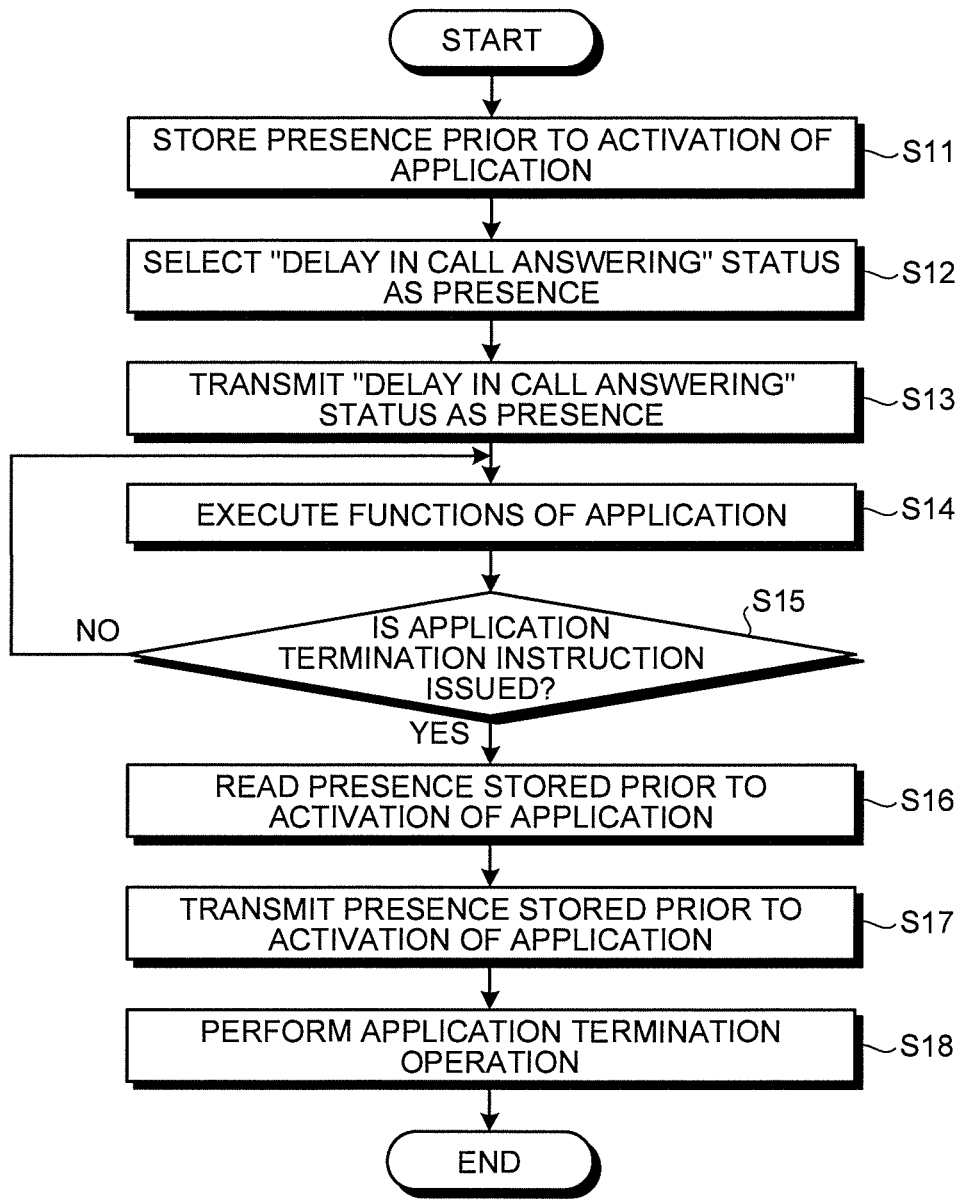
FIG. 5 is an exemplary flowchart of a presence transmission process in the first embodiment.

Described below is a presence transmission process performed by the TV receiver 1 of the first embodiment configured as above. FIG. 5 is a flowchart of the presence transmission process according to the first embodiment. The presence transmission process illustrated in FIG. 5 is performed by the application that is activated by the CPU 56 and that causes delay in answering an incoming call.

Once the application is activated, the execution controller 304 of the application stores, in the memory 52, presence prior to the activation of the application, i.e., pre-activation presence (S11).

Subsequently, from the memory 52, the presence transmitter 301 selects the "delay in call answering" status as the current presence (S12) and transmits the presence over the network 100 (S13). As a result, while the application that causes delay in answering an incoming call is running, the presence is transmitted to all devices connected to the network 100.

Then, the execution controller 304 executes the original functions of the application (S14) and waits in input wait mode for the input of an application termination instruction from the user (No at S15).

During the application is running, if an application termination instruction is received from the user (Yes at S15), the execution controller 304 reads the pre-activation presence (i.e., the presence of the user prior to the activation of the application) temporarily stored in the memory 52 (S16). Then, the presence transmitter 301 transmits the pre-activation presence over the network 100 (S17). Subsequently, the execution controller 304 terminates the application (S18), and thus, the application is closed. When the execution of the application that causes delay in answering an incoming call is terminated, the pre-activation presence is transmitted to all devices connected to the network 100.

Figure 6:
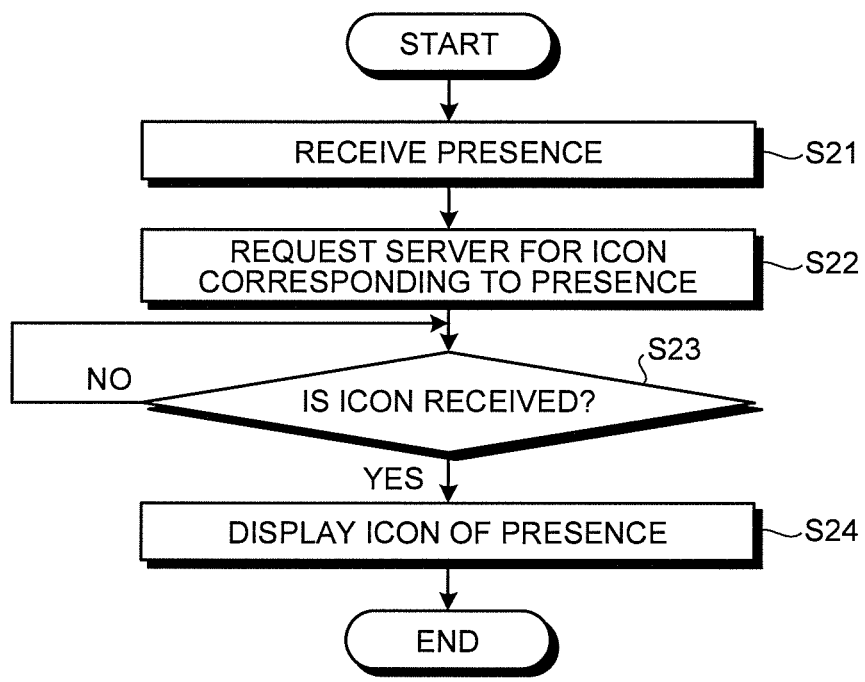
FIG. 6 is an exemplary flowchart of a display process performed in the information processor in the first embodiment.

Described below is a display process performed by the information processor 400 that, as a device at the other end of communication, receives presence from the TV receiver 1. FIG. 6 is a flowchart of the display process performed by the information processor 400 according to the first embodiment.

As described above at S13 and S17, the TV receiver 1 as a source transmits the presence of the user thereof. Then, the communication controller 401 of the information processor 400 receives the presence (S21).

Subsequently, the requesting module 404 requests the IP phone server 101 for an icon corresponding to the received presence (S22). Then, the communication controller 401 waits in reception wait mode for the icon to be sent from the IP phone server 101 (No at S23).

When the icon corresponding to the received presence is received from the IP phone server 101 (Yes at S23), the display controller 402 displays the icon corresponding to the presence of the user of the TV receiver 1 on a communication function screen displayed on the display module 403 (S24).

Figure 7:
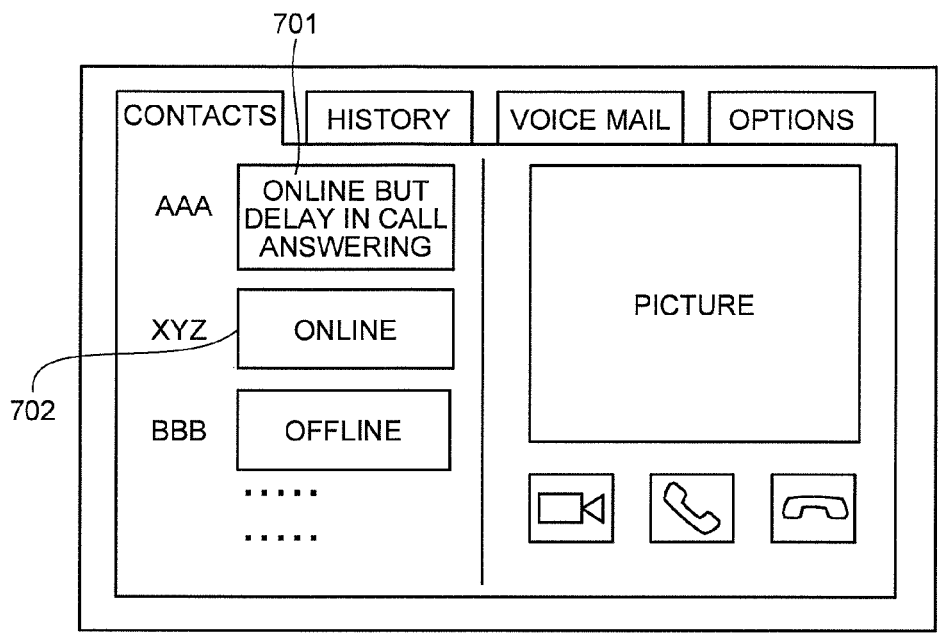
FIG. 7 is an exemplary diagram of a communication function screen displayed on a display module of the information processor in the first embodiment.

FIG. 7 illustrates an example of the communication function screen displayed on the display module 403. In the example of FIG. 7, an icon 702 corresponding to the "online" status is displayed as the presence of a user "XYZ". This means that the user of the information processor 400 is informed that, when a call is made to the user "XYZ", the call can be answered immediately.

On the other hand, in the example of FIG. 7, an icon 701 corresponding to "online but delay in call answering" status is displayed as the presence of a user "AAA". This informs the user of the information processor 400 that the user "AAA" is online but, if a call is made to the user "AAA", he/she may not be able to immediately switch to the communication function to answer the call. This enables the user of the information processor 400 to take measures such as either making a call after the presence of the user "AAA" is changed from the "online but delay in call answering" status to the "online"

status, or making a call and waiting for some time without hanging up even if the user "AAA" does not answer for a while.

As described above, according to the first embodiment, if an application that causes delay in answering an incoming call is running on the TV receiver 1, presence notifying that there would be delay in answering an incoming call is displayed on all devices at the other end of communication. Hence, a caller trying to make a call to the user of the TV receiver 1 is informed that there would be delay in answering the call. This prevents the caller from mistakenly hanging up assuming that the user of the TV receiver 1 is not available. Thus, it becomes possible to have smooth communication between the two.

Meanwhile, in the first embodiment, the "online" status and the "delay in call answering" status are combined as presence, and a single icon corresponding to the "online but require time for call answering" status is displayed; however, an icon corresponding to the "delay in call answering" status may be displayed independently of an icon corresponding to the "online" status.

Although icons each corresponding to presence are described as being displayed by text, they may be displayed by images.

In the first embodiment, if an application causing delay in answering an incoming call is running, the "delay in call answering" status is displayed as presence on all devices at the other end of communication. However, among functions of an application, some functions may not require many operations on the remote controller to switch to the communication function, while some functions may require a lot of operations on the remote controller to switch to the communication function. In the case of the former type of functions, it is possible to answer an incoming call relatively quickly. On the other hand, in the case of the latter type of functions, it takes time to answer an incoming call.

In this regard, according to a second embodiment, upon activating an application, when such a function of the application that causes delay in answering an incoming call is performed, the "delay in call answering" status is displayed as presence on all devices at the other end of communication.

Figure 8:
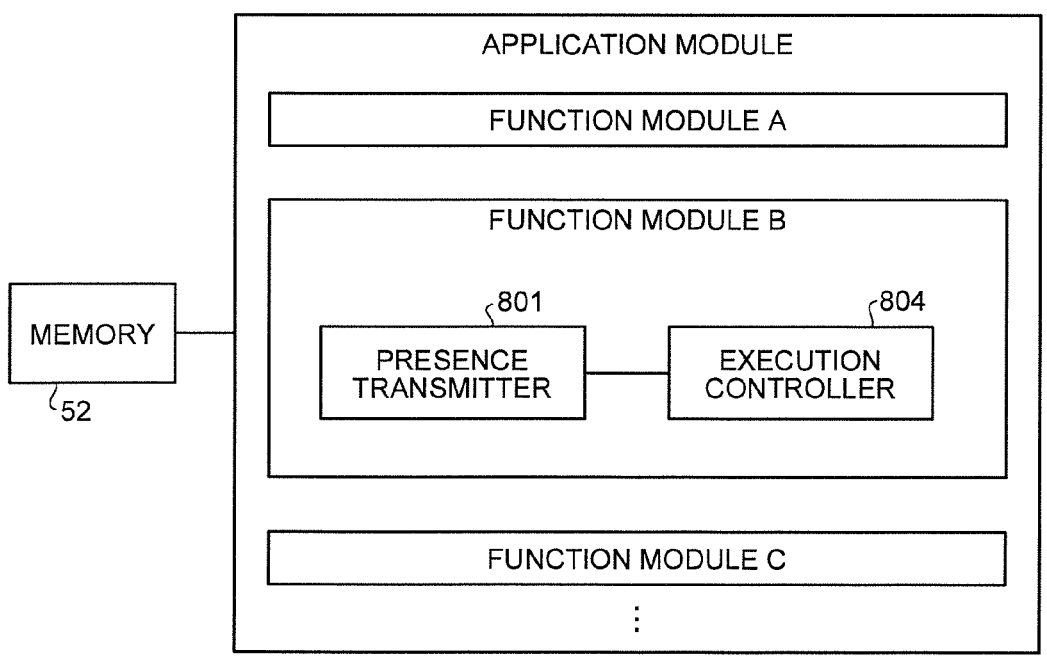
FIG. 8 is an exemplary functional block diagram of a configuration of an application according to a second embodiment.

FIG. 8 is a functional block diagram of a configuration of an application according to the second embodiment. As illustrated in FIG. 8, the application comprises a plurality of function modules such as a function module A, a function module B, and a function module C.

In the example of FIG. 8, the function modules A and C are functions that allow immediately switch to the communication function by operation on the remote controller when an incoming call is received. On the other hand, the function module B is a specific function that causes difficulty in immediately switching to the communication function due to the need of many operations on the remote controller when an incoming call is received. That causes delay in answering the incoming call. Examples of the functions causing delay in answering an incoming call include, but are not limited to, setting function of TV application and program guide display function of programmed recording application.

In the second embodiment, as in the first embodiment, "online" status, "offline" status, "away" status, and "delay in call answering" status are stored as presences in the memory 52.

As illustrated in FIG. 8, the function module B that causes delay in answering an incoming call mainly comprises a presence transmitter 801 and an execution controller 804.

The execution controller 804 controls execution of the function module B. When the function module B (specific function) is activated, the execution controller 804 stores, in the memory 52, presence prior to the activation of the function module B as pre-activation presence. Then, when the execution of the function module B is terminated, the execution controller 804 retrieves the pre-activation presence from the memory 52 and sets it as current presence.

Once the function module B is activated, the presence transmitter 801 selects the "delay in call answering" status as presence from among the presences stored in the memory 52, and transmits the presence over the network 100. As a result, in presence display of the communication function of all devices connected to the network 100, an icon corresponding to the "delay in call answering" status is displayed as the presence of the user of the TV receiver 1.

The information processor 400 as a device at the other end of communication with the user of the TV receiver 1 is of the same configuration and functions in the same manner as described in the first embodiment.

Described below is a presence transmission process performed by the TV receiver 1 of the second embodiment configured as above. FIG. 9 is a flowchart of the presence transmission process according to the second embodiment.

Once the application is activated, first, the function modules of the application are executed (S31). Subsequently, upon receipt of an instruction to execute a function module causing delay in answering an incoming call from the user (Yes at S32), the function module B is activated. At this time, the execution controller 804 of the function module B stores, in the memory 52, presence prior to the activation of the function module B, i.e., pre-activation presence (S33).

Subsequently, from the memory 52, the presence transmitter 801 of the function module B selects the "delay in call answering" status as the current presence (S34) and transmits the presence over the network 100 (S35). As a result, while the function module B that causes delay in answering an incoming call is being executed, the presence is transmitted to all devices connected to the network 100.

Then, the execution controller 804 executes the original functions of the function module B (S36) and waits in input wait mode for the user input of an instruction to terminate the function module B (No at S37).

During the execution of the function module B, if an instruction to execute another function module, i.e., an instruction to terminate the function module B is received from the user (Yes at S37), the execution controller 804 reads the pre-activation presence (i.e., the presence of the user prior to the activation of the function module B) stored temporarily in the memory 52 (S38). Then, the presence transmitter 801 transmits the pre-activation presence over the network 100 (S39). Subsequently, the execution controller 804 executes the other function module specified by the user (S40). Thus, when the execution of the function module B that causes delay in answering an incoming call is terminated, the pre-activation presence is transmitted to all devices connected to the network 100.

The display process to display an icon corresponding to the presences is performed by the information processor 400 in the same manner as described in the first embodiment.

As described above, according to the second embodiment, when a function of an application that cause delay in answering an incoming call is performed on the TV receiver 1, presence notifying that there would be delay in answering an incoming call is displayed on all devices at the other end of communication. Hence, a caller trying to make a call to the user of the TV receiver 1 is informed that there would be delay in answering the call. This prevents the caller from mistakenly hanging up assuming that the user of the TV receiver 1 is not available. Thus, it becomes possible to have smooth communication between the two.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A presence transmission method comprising:
controlling communication of a call via a network;
transmitting, via the network, a first presence indicating a current status; and
executing predetermined functions, wherein
the transmitting includes transmitting the first presence indicating that it takes time to answer an incoming call when a specific function among the predetermined functions is to be executed, the specific function causing delay in answering the incoming call,
the executing includes storing a presence prior to activation of the specific function as a pre-activation presence in a memory upon the activation of the specific function, and obtaining the pre-activation presence upon completion of execution of the specific function, and
the transmitting includes transmitting the pre-activation presence upon the completion of the execution of the specific function.

2. The presence transmitting method of claim 1, wherein
the executing includes controlling execution of applications corresponding to the predetermined functions, and
the transmitting includes, if a specific application as the specific function is to be executed among the applications, transmitting, via the network, the first presence indicating that it takes time to answer an incoming call.

3. The presence transmitting method of claim 1, wherein
the executing includes executing the predetermined functions in an application, and
the transmitting includes, if the specific function is to be executed among the predetermined functions in the application, transmitting, via the network, the first presence indicating that it takes time to answer an incoming call.

4. A video display device comprising:
a communication controller configured to control communication of a call via the network;
a transmitter configured to transmit, via the network, presence indicating a current status; and
an execution controller configured to execute predetermined functions, wherein the transmitter transmits a first presence indicating that it takes time to answer an incoming call when a specific function among the predetermined functions is to be executed, the specific function causing delay in answering the incoming call,
the execution controller is configured to store a presence prior to activation of the specific function as pre-activation presence in the memory upon the activation of the specific function, and to obtain the pre-activation presence upon completion of execution of the specific function, and
the transmitter is configured to transmit the pre-activation presence as the first presence upon the completion of the execution of the specific function.

5. The video display device of claim 4, wherein
the execution controller is configured to control execution of applications corresponding to the predetermined functions, and
if a specific application as the specific function is to be executed among the applications, the transmitter transmits, via the network, the first presence indicating that it takes time to answer an incoming call.

6. The video display device of claim 4, wherein
the execution controller is configured to execute the predetermined functions in an application, and
if the specific function is to be executed among the predetermined functions in the application, the transmitter transmits, via the network, the first presence indicating that it takes time to answer an incoming call.

7. A video display system comprising:
a video display device; and
an information processor connected to the video display device via a network,
wherein the video display device comprising
a communication controller configured to control communication of a call with the information processor via the network,
a transmitter configured to transmit, via the network, a first presence indicating a current status, and
an execution controller configured to execute predetermined functions, and
wherein the transmitter transmits, the first presence indicating that it is difficult to answer an incoming call when a specific function among the predetermined functions is to be executed, the specific function causing delay in answering the incoming call,
the execution controller is configured to store a presence prior to activation of the specific function as pre-activation presence in the memory upon the activation of the specific function, and to obtain the pre-activation presence upon completion of execution of the specific function, and
the transmitter is configured to transmit the pre-activation presence upon the completion of the execution of the specific function, and
wherein the information processor comprising
a receiver configured to receive the first presence, and
a display module configured to display an icon corresponding to the first presence.

* * * * *